United States Patent
Polegato Moretti

(10) Patent No.: US 7,823,297 B2
(45) Date of Patent: Nov. 2, 2010

(54) SHOE WITH BREATHABLE AND WATERPROOF SOLE AND UPPER

(75) Inventor: Mario Polegato Moretti, Crocetta del Montello (IT)

(73) Assignee: Geox S.p.A., Montebelluna (IT)

( * ) Notice: Subject to any disclaimer, the term of this patent is extended or adjusted under 35 U.S.C. 154(b) by 1076 days.

(21) Appl. No.: 10/586,653

(22) PCT Filed: Jan. 20, 2005

(86) PCT No.: PCT/EP2005/000524

§ 371 (c)(1),
(2), (4) Date: Jul. 19, 2006

(87) PCT Pub. No.: WO2005/070658

PCT Pub. Date: Aug. 4, 2005

(65) Prior Publication Data

US 2007/0180731 A1     Aug. 9, 2007

(30) Foreign Application Priority Data

Jan. 22, 2004  (IT)  ............... PD2004A0014

(51) Int. Cl.
| | |
|---|---|
| A43B 7/06 | (2006.01) |
| A43B 7/08 | (2006.01) |
| A43B 17/08 | (2006.01) |
| A43B 13/28 | (2006.01) |
| A43B 23/07 | (2006.01) |

(52) U.S. Cl. .................. 36/3 R; 36/21; 36/55; 36/12

(58) Field of Classification Search ............ 36/12, 36/14, 16, 18, 19 R, 19 A, 19.5, 21, 22 R, 36/30 R, 30 A, 75 R, 98, 35 B, 3 R, 3 A, 36/3 B, 55

See application file for complete search history.

(56) References Cited

U.S. PATENT DOCUMENTS

| | | | |
|---|---|---|---|
| 3,216,033 A | | 11/1965 | Nadler |
| 5,930,917 A | * | 8/1999 | Pavelescu et al. ............... 36/12 |
| 5,983,524 A | * | 11/1999 | Polegato ...................... 36/3 R |

(Continued)

FOREIGN PATENT DOCUMENTS

DE              1 865 431           1/1963

(Continued)

OTHER PUBLICATIONS

International Search Report for PCT/EP2005/000524.

(Continued)

*Primary Examiner*—Mickey Yu
*Assistant Examiner*—Melissa L Lalli
(74) *Attorney, Agent, or Firm*—Oblon, Spivak, McClelland, Maier & Neustadt, L.L.P.

(57) ABSTRACT

A shoe with a breathable and waterproof sole and upper, including a breathable and waterproof sole, an assembly associated with the sole in an upward region, an external breathable upper, an internal lining and, between them, a breathable and waterproof membrane, and an at least partially perforated or breathable insole, which is joined at least to the upper and to the breathable and waterproof membrane. The shoe thereby has a sole that is joined hermetically and peripherally to the assembly at the connecting region between the upper and the breathable and waterproof membrane.

4 Claims, 5 Drawing Sheets

U.S. PATENT DOCUMENTS

| | | |
|---|---|---|
| 6,408,541 B1 | 6/2002 | Moretti |
| 6,769,201 B2 * | 8/2004 | Pavelescu et al. .............. 36/12 |
| 2002/0157278 A1 | 10/2002 | Moretti |
| 2004/0098880 A1 | 5/2004 | Chen |

FOREIGN PATENT DOCUMENTS

| | | |
|---|---|---|
| EP | 0 629 359 | 12/1994 |
| FR | 1 066 360 | 6/1954 |
| FR | 1 432 176 | 3/1966 |
| FR | 2 825 241 | 12/2002 |
| JP | 51 129341 | 11/1976 |
| JP | 58 110786 | 7/1983 |
| JP | 3 197110 | 8/1991 |
| JP | 5 177661 | 7/1993 |
| JP | 11 309742 | 11/1999 |
| WO | 03 006221 | 1/2003 |
| WO | 2004 004505 | 1/2004 |

OTHER PUBLICATIONS

U.S. Appl. No. 12/596,030, filed Oct. 15, 2009, Polegato Moretti.

* cited by examiner

SHOE WITH BREATHABLE AND WATERPROOF SOLE AND UPPER

The present invention relates to a shoe with breathable and waterproof sole and upper.

BACKGROUND OF THE INVENTION

It is now well known that the comfort of a shoe depends not only on its correct anatomical fit but also on correct outward permeation of the water vapor that has formed inside the shoe due to perspiration.

However, this permeation of the water vapor must not compromise the waterproofness of the shoe.

Traditionally, breathable shoes are shoes that use natural materials such as leather or equivalent products, which however, in the presence of rain or bad weather, indeed because of their permeation properties, do not ensure good waterproofness and indeed absorb water rather easily.

For this reason, shoes with an upper made of leather (or the like) coupled with a lining provided with a breathable and waterproof membrane (for example made of a material such as Gore-Tex® or the like), sewn or glued to an insole, have now been in use for a few years.

In the manufacture of these shoes, it is critical to pay attention to the seal of the regions where the insole and the lining connect to the membrane and the sole, in order to avoid even the slightest seepage of water from outside.

Most of the perspiration of the foot is generated at the interface between the sole of the foot and the sole of the shoe, which is typically made of polymeric material; it is evident that the perspiration that has formed on this interface is unable to evaporate, consequently condensing on the plantar insert on which the foot rests. Only a small percentage of the perspiration evaporates through the upper.

Accordingly, shoes that have breathable and waterproof soles have now been studied for years.

One of these soles is disclosed in U.S. Pat. No. 5,044,096 and in EP-0382904, and consists in dividing the sole, made of plastic material, into two layers with through holes and in interposing a membrane that is impermeable to water and breathable (made for example of a material such as Gore-Tex® or the like) and is joined perimetrically and hermetically to the two layers, so as to hinder any water infiltrations.

This sole ensures correct vapor permeation as well as an effective exchange of heat and water vapor between the environment inside the shoe and the external environment, at the same time ensuring the necessary waterproofness with respect to external humidity and water.

To provide a completely waterproof shoe, it is possible to couple a waterproof breathable sole to a waterproof breathable upper such as those described.

The step of waterproofing the regions connecting the insole and the lining to the membrane is also critical in the manufacture of shoes of this type.

SUMMARY OF THE INVENTION

The aim of the present invention is to provide a shoe with a sole and an upper that are breathable and ensure complete waterproofness.

Within this aim, an object of the present invention is to provide a shoe with breathable and waterproof sole and upper that is structurally simple to obtain.

Another object of the present invention is to provide a shoe with breathable and waterproof sole and upper that can be manufactured by resorting to the direct injection of polymeric material.

Another object of the present invention is to provide a shoe with breathable and waterproof sole and upper that is tough and durable.

Another object of the present invention is to provide a shoe with breathable and waterproof sole and upper that can be manufactured with conventional systems and technologies.

This aim and these and other objects that will become better apparent hereinafter are achieved by a shoe with breathable and waterproof sole and upper, comprising a breathable and waterproof sole and an assembly that is associated with said sole in an upward region and is constituted by:

an external breathable upper, an internal lining and, between them, a breathable and waterproof membrane, an at least partially perforated or breathable insole, which is joined at least to said upper and said membrane, said breathable and waterproof sole being at least partially overmolded on said assembly, said shoe being characterized in that said upper is provided with passages toward said membrane for the polymeric material during the overmolding of said sole, said passages being arranged substantially at the connecting region between said upper and said membrane, said sole being joined hermetically and perimetrically to said assembly in said connecting region.

Advantageously, the invention comprises a shoe with breathable and waterproof sole and upper that comprises a breathable and waterproof sole and an assembly that is associated in an upward region with respect to said sole and is constituted by:

an external breathable upper, an internal lining and, between them, a breathable and waterproof membrane, an at least partially perforated or breathable insole, which is joined at least to said membrane, said shoe being characterized in that it comprises a waterproof inshoe, which is at least partially perforated or breathable at the region of said sole that is assigned to vapor permeation, said inshoe being associated in a downward region with said insole and having a perimetric edge that completely overlaps the connecting region between said insole and said breathable and waterproof membrane so as to provide a perimetric seal, said upper adhering to said inshoe, said breathable and waterproof sole being hermetically associated with said assembly only at said upper and at the exposed portion, if any, of said inshoe, without affecting the remaining central part that corresponds to the region assigned to vapor permeation.

Conveniently, the invention comprises a method for manufacturing a breathable and waterproof sole, which consists in:
injection-molding at least one perforated lower sole layer,
arranging, inside a mold, a breathable and waterproof membrane element on said at least one perforated lower layer,
arranging at least one breathable element on top of said breathable and waterproof membrane element,
covering with an adhesive film the surface of said at least one breathable element that lies opposite said breathable and waterproof membrane element,
overmolding a peripheral skirt on said at least one perforated lower layer and laterally to said at least one breathable element,
removing said adhesive film.

The invention further comprises a method for manufacturing a perforated portion of a breathable and waterproof sole, which consists in injecting melted polymeric material into a mold constituted by a female mold part and an upper closing mold part, said female mold part being provided with pin-shaped inserts that protrude in the direction in which said mold opens and are located at the region of said sole portion assigned to vapor permeation, plate-like sealing means being interposed with interference between the apex surface of said pin-like inserts and said upper closing mold part.

BRIEF DESCRIPTION OF THE DRAWINGS

Further characteristics and advantages of the invention will become better apparent from the description of some preferred but not exclusive embodiments thereof, illustrated by way of non-limiting example in the accompanying drawings, wherein.

DESCRIPTION OF THE PREFERRED EMBODIMENTS

Figure 1:
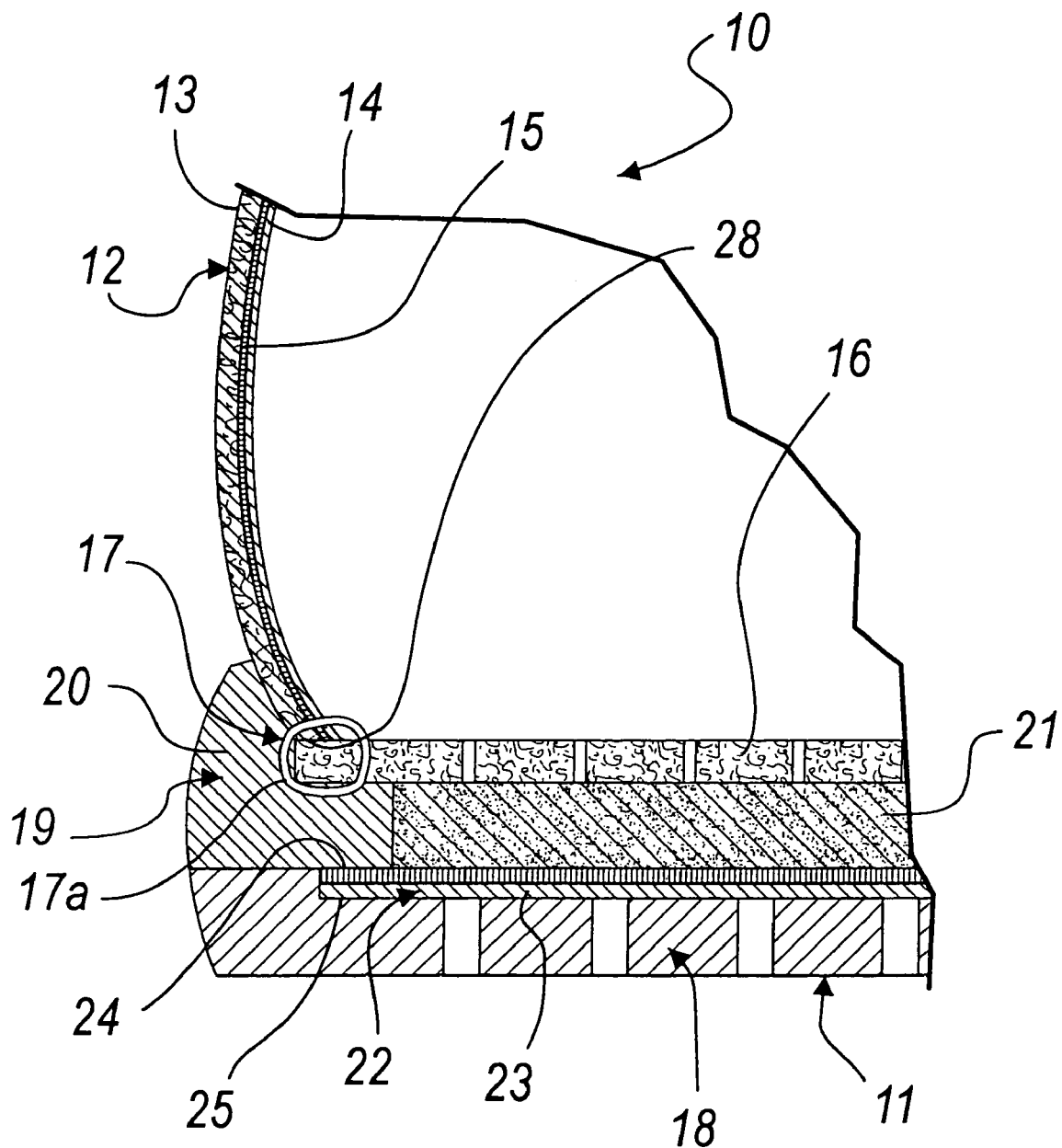
FIG. 1 is a transverse sectional view of a portion of a shoe according to the invention, in a first embodiment.
Figure 2:
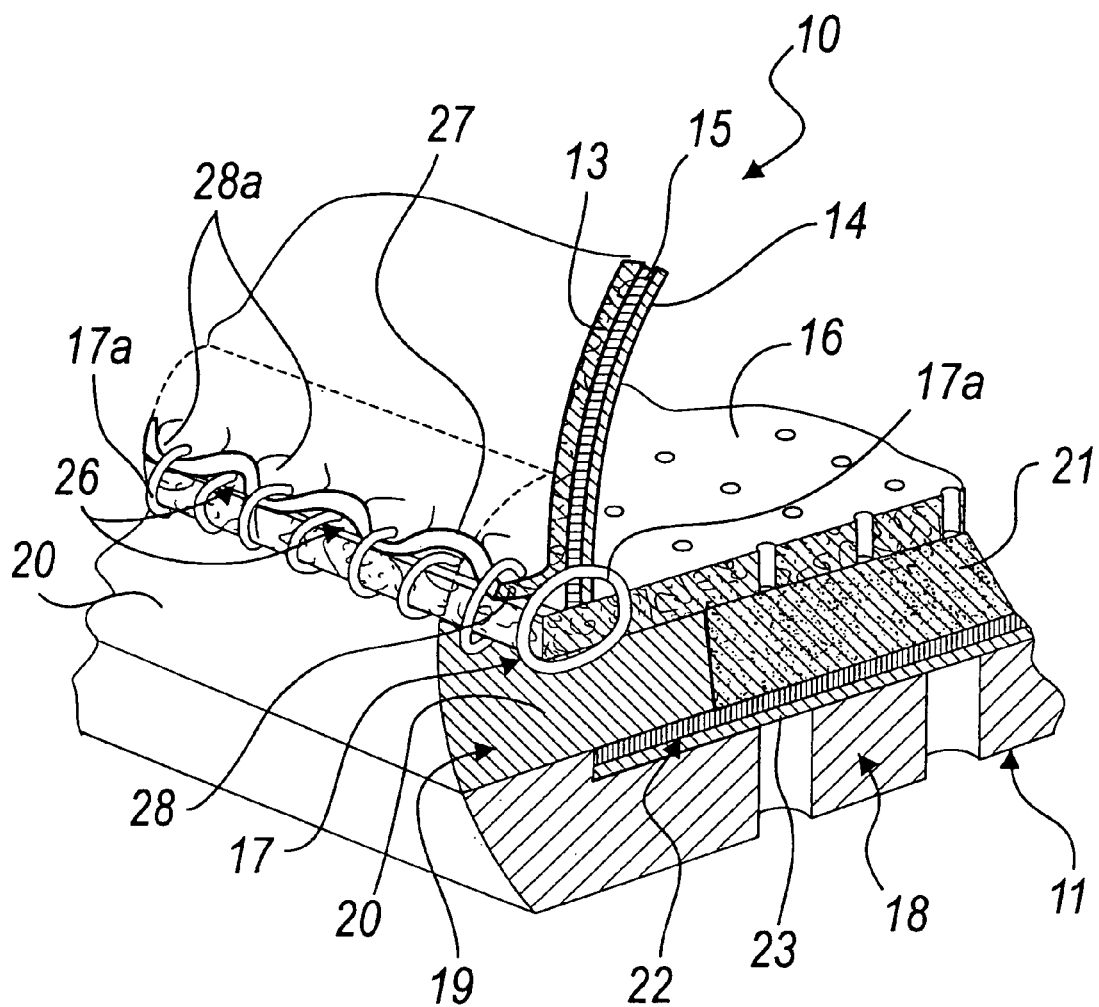
FIG. 2 is a perspective view of the portion of shoe of FIG. 1.

With reference to FIGS. 1 and 2, a first embodiment of a breathable and waterproof shoe according to the invention is generally designated by the reference numeral 10.

The shoe 10 comprises a breathable and waterproof sole 11, described hereinafter, and an assembly 12 that is associated with it in an upward region and is constituted by an external breathable upper 13, an internal lining 14 and, between them, a breathable and waterproof membrane 15, which is made for example of a material such as Gore-Tex® or the like.

The assembly 12 is closed in a downward region by an insole 16, which, in this embodiment, is perforated but can be made of breathable material.

Said insole 16 is connected to said upper 13, said lining 14 and said membrane 15 in a common connecting region 17, for example by means of a stitched seam 17a of the strobel type, which is per se known.

In this embodiment, the breathable and waterproof sole 11 is joined peripherally or perimetrically and hermetically to the assembly 12 by overmolding a portion thereof, as described hereinafter.

The sole 11 is composed of a perforated lower layer 18, which forms the tread, and of an upper layer 19.

Said upper layer 19 is constituted by an external peripheral or perimetric skirt 20 and is constituted centrally by a breathable element 21.

Said breathable element 21 is obviously arranged substantially at the portion of the insole 16 that is assigned to vapor permeation and at the perforated area of the tread.

A breathable and waterproof membrane element 22, made for example of Gore-Tex® or the like, is arranged between said lower layer 18 and the upper layer 19.

Said layer of breathable and waterproof membrane 22 also comprises a breathable lower protective layer 23, which is per se known.

Said breathable and waterproof membrane element 22 is connected hermetically, in its peripheral region 24, to the assembly of the sole 11.

The breathable and waterproof membrane element 22 is arranged in a flat pocket 25, which is formed on the upper surface of the lower layer 18.

In particular, the peripheral region 24 of said breathable and waterproof membrane element 22 is sandwiched between the skirt 20 and the lower layer 18.

The method for manufacturing the shoe 10 provides, for example, for the manufacture of the lower layer 18 by direct injection in a mold, for the subsequent application of the membrane element 22 in the mold, and for the placement of the breathable element 21.

The assembly 12 is fitted on a last and inserted in the mold, placing the insole 16 in contact with the breathable element 21.

At this point, the part of the sole 11 related to the external peripheral skirt 20 is overmolded.

The upper 13 is provided with passages 26 toward the breathable and waterproof membrane 15 for the polymeric material during the overmolding of the sole portion 11 related to the skirt 20.

Said passages 26 are arranged substantially at the connecting region 17 between the upper 13, the lining 14, and the membrane 15.

In said connecting region 17, the sole 11 is hermetically joined to the assembly 12.

Said passages 26 of the upper 13 in fact allow the fluid mass of polymer (for example polyurethane), during the overmolding of the external peripheral skirt 20, to reach the surface of the membrane 15, adhering and anchoring itself thereto and forming a watertight seal.

In this described embodiment, these passages are provided for example by forming a "deep undulation" 27 on the lower edge 28 of the upper 13, so that the stitched seam 17a joins only the crests 28a of said "deep undulation" 27 to the membrane 15 and to the insole 16.

In this way, the melted mass of polymer penetrates through said "deep undulation" 27, completely surrounding the stitched seam 17a, penetrating into the holes of said stitched seam 17a, and bonding with the membrane 15.

It should be stressed that the skirt 20 completely overlaps the stitched seam 17a.

Figure 3:
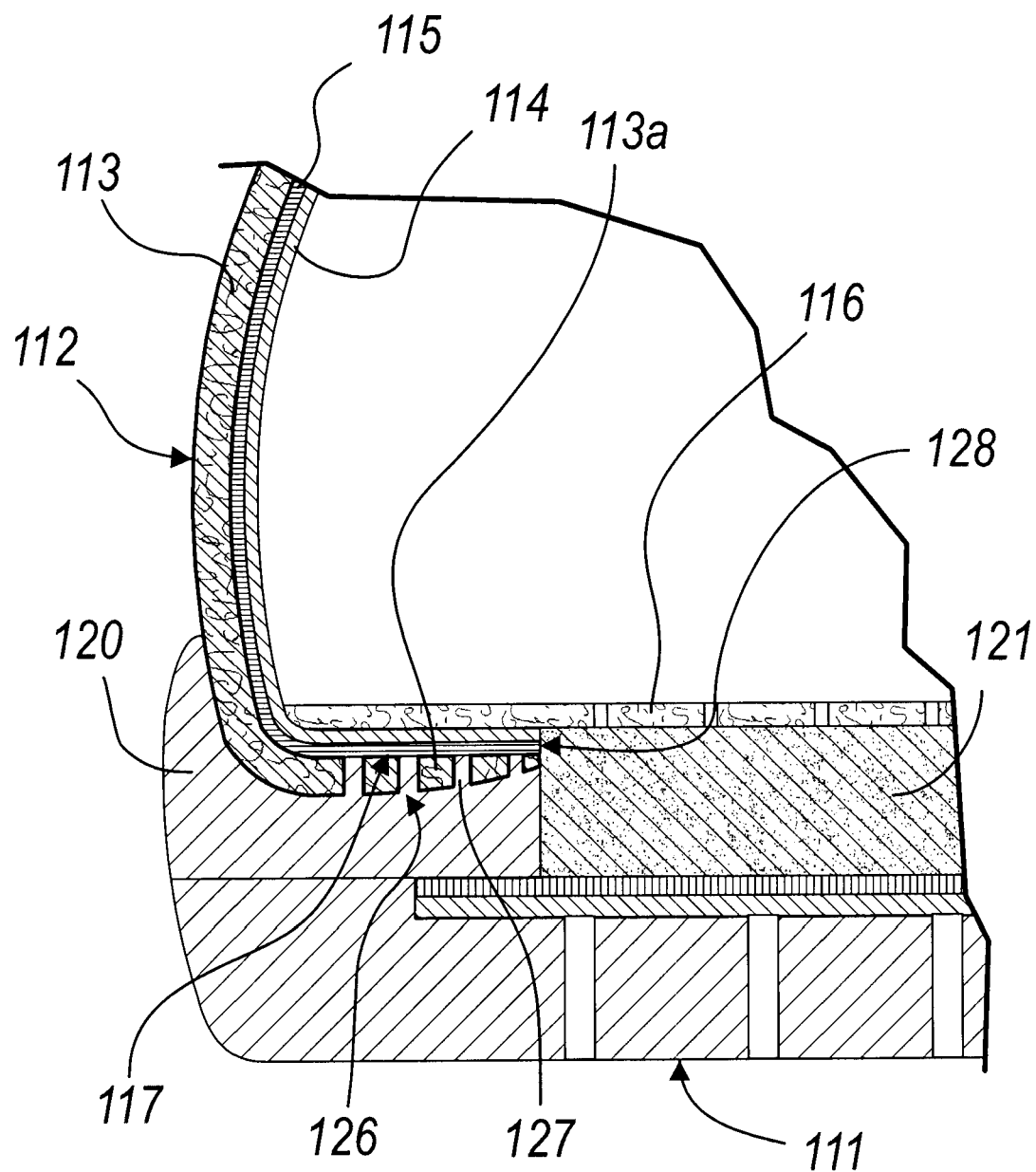
FIG. 3 is a transverse sectional view of a portion of a variation of said first embodiment of the shoe, according to the invention.

A variation of this first embodiment of the shoe, now generally designated by the reference numeral 100, is shown in FIG. 3.

This variation differs from the previously described embodiment only in the region, now designated by the reference numeral 117, for connection of the upper 113, of the lining 114 and of the breathable and waterproof membrane 115 to the perforated insole 116.

In this case, the lower edges of the lining 114, the membrane 115 and the upper 113, generally designated by the reference numeral 128, are folded and glued under the perforated insole 116 and lie adjacent to the breathable element 121 of the sole 111.

Said lower edges 128 are in practice locked in a sandwich-like fashion between the perforated insole 116 and the skirt 120.

In this variation also, the upper 113 is provided with passages 126 toward the breathable and waterproof membrane 115 for the polymeric material during the overmolding of the sole portion 111 related to the skirt 120.

These passages 126 are also arranged substantially at the region 117 for connection between the upper 113, the lining 114 and the membrane 115.

In said connecting region 117, the sole 111 is hermetically joined to the assembly 112.

Said passages 126 are constituted by through holes 127, which are provided on the upper portion 113a that is folded under the insole 116.

Similarly to what has been described earlier, said passages 126 of the upper 113 allow the fluid mass of the polymer (for example polyurethane), during the overmolding of the external perimetric skirt 120, to reach the surface of the membrane 115, adhering and anchoring thereto and forming a watertight sealing area.

Figure 4:
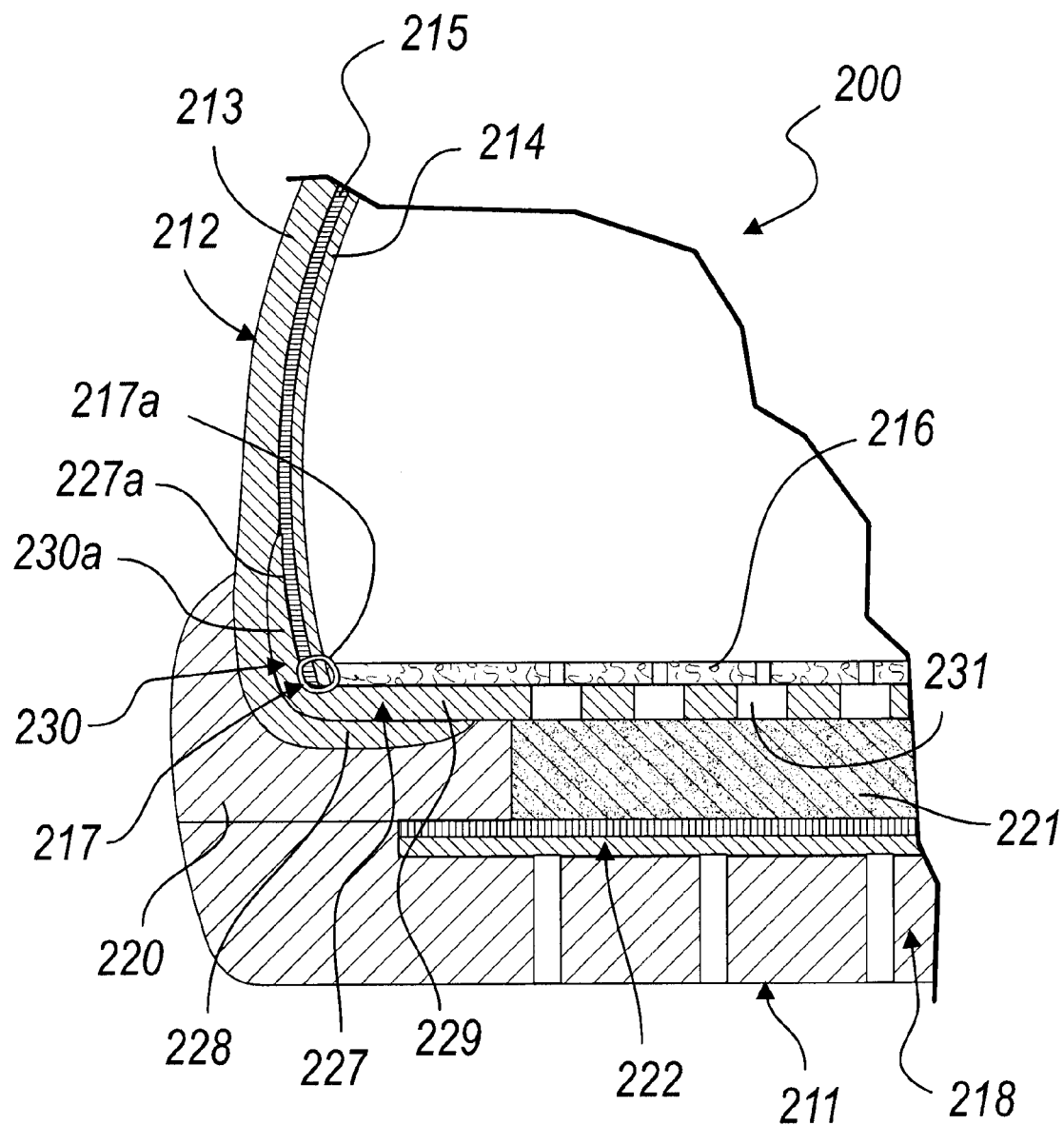
FIG. 4 is a transverse sectional view of a portion of the shoe according to the invention, in a second embodiment.

FIG. 4 illustrates a second embodiment of a shoe according to the invention, generally designated by the reference numeral 200.

Said shoe 200 comprises a breathable and waterproof sole 211, which is substantially similar to those described earlier, and an assembly 212, which is associated with said sole in an upward region and is constituted by an external breathable upper 213, an internal lining 214 and, between them, a breathable and waterproof membrane 215, which is made for example of a material such as Gore-Tex® or the like.

The assembly 212 is closed in a downward region by an insole 216, which is perforated in this embodiment but can be made of breathable material.

Said insole 216 is joined to said lining 214 and to said membrane 215 in a common joining region 217, for example by means of a stitched seam 217a of the strobel type, which is per se known.

The shoe 200 further comprises a waterproof inshoe 227, which is associated in a downward region with the insole 216 and is interposed between said insole and the sole 211.

In practice, said waterproof inshoe 227 is constituted by a base insole 229, in which the peripheral edge 230 completely overlaps the connecting region 217 between the insole 216 and the breathable and waterproof membrane 215, so as to provide a peripheral seal formed by a sealing area 227a.

In particular, said peripheral edge 230 forms side walls 230a of the inshoe 227 that rise beyond the stitched seam 217a, adhering completely to the membrane 215 and providing said peripheral seal.

The upper 213 adheres to said inshoe 227 and its lower edge 228 is folded and glued in contact below the inshoe 227.

Said inshoe 227 can be provided by direct overmolding on the assembly (particularly on the membrane 215), in which case the fluid polymer mass surrounds the stitched seam 217a as described in the previous cases, or said inshoe can be pre-molded or glued, in any case taking care to seal the region of the stitched seam 217a.

Said inshoe 227 is provided with suitable holes 231 (or, in an equivalent manner, can be breathable) at the region of the sole 211 assigned to permeation; it is evident that the inshoe 227, in an extreme case, can also be perforated with a single "macroperforation".

A structure of this type allows to provide the sole 211 separately and to apply it subsequently, for example by gluing, to the assembly 212 with the inshoe 227.

As an alternative, it is possible to provide the shoe 200, as described in the previous examples, by providing part of the sole 211 by overmolding on the assembly 212.

The sole 211, in this embodiment, has substantially the same structure as in the previously described examples of shoes.

The method is for example as follows: the lower layer 218 is provided by direct injection in a mold.

The membrane element 222 is then applied in the mold and the breathable element 221 is positioned.

The assembly 212 is fitted on a last, which is inserted in the mold, placing the inshoe 227 in contact with the breathable element 221.

At this point, the part of the sole 211 related to the outer peripheral skirt 220 is overmolded.

In any case, the sole 211 is hermetically associated with the assembly 212 only at the upper 213 and at the exposed portion of the inshoe 227 (i.e., the portion that is not covered by the fold of the upper 213 and is optionally not present), without affecting the remaining central part that corresponds to the region assigned to vapor permeation.

It is evident that in order to produce a sole 211 such as the one described, to be applied below an assembly 212, for example by gluing, it is necessary to perform refinements in order to prevent the melted polymer, during the injection steps, from covering the parts assigned to vapor permeation.

Figure 5:
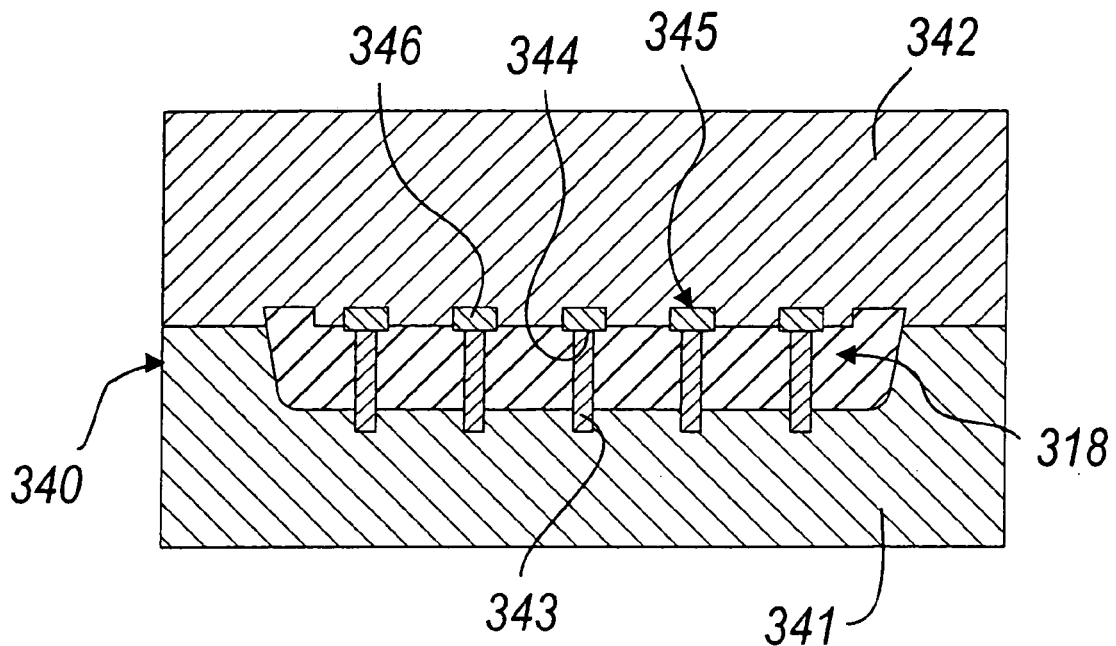
FIG. 5 is a schematic transverse sectional view of a first mold for providing soles to be used in shoes according to FIG. 4.
Figure 6:
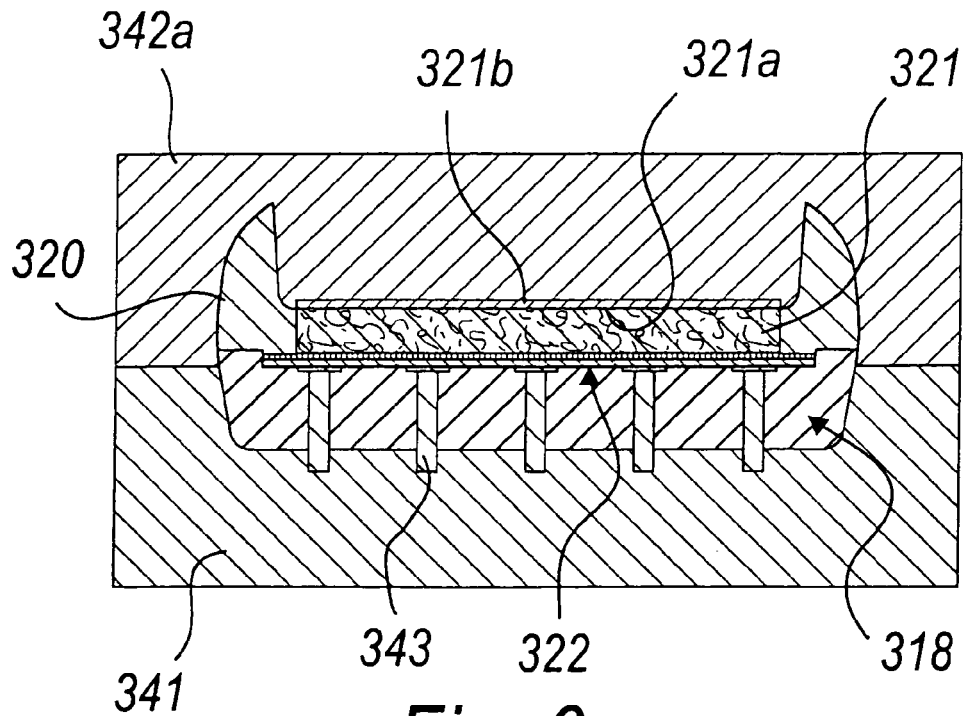
FIG. 6 is a schematic transverse sectional view of a second mold for providing soles to be used in shoes according to FIG. 4.

For example, with reference to FIGS. 5 and 6, a method for manufacturing a breathable and waterproof sole is as follows.

A perforated lower sole layer 318, which corresponds for example to the tread of the sole, is injection-molded in a mold 340 formed by a female mold part 341 and by an upper closing mold part 342.

Keeping for example the same female mold part 341, a breathable and waterproof membrane element 322 is arranged in the mold so as to rest on the perforated lower layer 318.

A breathable element 321 is then arranged above said breathable and waterproof membrane element 322.

Said breathable element 321 has an adhesive film 321b on the surface 321a that lies opposite with respect to said breathable and waterproof membrane element 322.

At this point, the female mold part 341 is closed with an upper female mold part 342a and melted polymer is overmolded in order to provide the peripheral skirt 320.

Said peripheral skirt 320 laterally surrounds the breathable element 321.

The mold 340 is opened and the adhesive film 321b is removed.

Said adhesive film allows to prevent melted polymer from seeping above the breathable element 321, covering it and thus limiting its breathability.

Likewise, in order to prevent the melted polymer from seeping above the vapor permeation holes during the injection of the lower layer 318 of the sole 311, the molding process provides for particular refinements.

The female mold part 341 is provided with pin-shaped inserts 343, which protrude in the direction in which the mold 340 opens and are located at the region of the sole assigned to vapor permeation.

Plate-like sealing means 345 are interposed with interference between the apex surface 344 of the pin-shaped inserts 343 and the upper closing mold part 342.

Said plate-like sealing means 345 are constituted by plates 346 made of rigid polymeric material, to be arranged at each pin-shaped insert 343.

In particular, said plates 346 are slightly wider than the corresponding pin-shaped insert 343.

Said plates 346, kept pressed on the apex surface 344 of the pin-shaped inserts 343, prevent, during injection, the melted polymer mass from seeping above the apex surfaces 344, obstructing the vapor permeation holes that form once the sole 311 is extracted.

In practice it has been observed that the invention thus described solves the intended aim and objects.

In particular, the present invention provides a shoe with breathable sole and upper that ensure complete waterproofness, since all the possible regions of water infiltration between a breathable and waterproof sole and a likewise breathable and waterproof "upper assembly" are in fact completely sealed.

Moreover, the present invention provides a shoe with breathable and waterproof sole and upper that is structurally simple to obtain.

Moreover, said shoe with breathable and waterproof sole and upper can be manufactured by using the technique of direct injection of polymeric material.

In this regard, the invention has advantageously solved, thanks to refinements in the injection-molding process, problems linked to the seepage of melted polymeric material in regions intended for vapor permeation, thus ensuring high standards of breathability.

The invention thus conceived is susceptible of numerous modifications and variations, all of which are within the scope of the appended claims; moreover, all the details may be replaced with other technically equivalent elements.

In practice, the materials used, so long as they are compatible with the specific use, as well as the dimensions, may be any according to requirements and to the state of the art.

The disclosures in Italian Patent Application No. PD2004A000014 from which this application claims priority are incorporated herein by reference.

The invention claimed is:

1. A shoe provided with breathable and waterproof sole and upper, comprising:
   a breathable and waterproof sole and an upper assembly, which is associated with said sole in an upward region;
   said upper assembly including an external breathable upper, an internal lining, and a breathable and waterproof membrane located between said external breathable upper and said lining;
   at least one partially perforated or breathable insole, which is joined at least to said breathable and waterproof membrane;
   a waterproof inshoe, which is at least partially perforated or breathable at a region of said sole that is assigned to vapor permeation, said inshoe being associated in a downward region with said insole, with a peripheral edge thereof completely overlapping a connecting region between said insole and said breathable and waterproof membrane so as to provide a peripheral seal, said external breathable upper adhering to said inshoe and having a lower edge that is folded and glued so as to adhere under said inshoe, said breathable and waterproof sole being connected hermetically and peripherally with said upper assembly only at said external breathable upper and at an exposed portion of said inshoe, while leaving free of connection a remaining central part that corresponds to the region assigned to vapor permeation.

2. The shoe according to claim 1, wherein said insole is joined to at least said breathable and waterproof membrane in said connecting region by a stitched seam of a strobel type, said peripheral edge forming lateral sides of said inshoe, which rise beyond said stitched seam, adhering completely to said breathable and waterproof membrane and forming said peripheral seal.

3. The shoe according to claim 2, wherein said inshoe is provided as a direct overmolding on said assembly, on said breathable and waterproof membrane.

4. The shoe according to claim 3, wherein said inshoe is provided separately and is coupled hermetically to said assembly by gluing.

* * * * *